US009346111B2

(12) United States Patent
Behling

(10) Patent No.: US 9,346,111 B2
(45) Date of Patent: May 24, 2016

(54) MACHINE TO MANUFACTURE GUN BARRELS AND METHOD OF USING

(71) Applicant: Small Arms Manufacturing Co., Inc., Bridgeville, PA (US)

(72) Inventor: Carl H. Behling, Bridgeville, PA (US)

(73) Assignee: E.R. Shaw Inc., Bridgeville, PA (US)

( * ) Notice: Subject to any disclaimer, the term of this patent is extended or adjusted under 35 U.S.C. 154(b) by 0 days.

(21) Appl. No.: 14/337,319

(22) Filed: Jul. 22, 2014

(65) Prior Publication Data

US 2015/0027022 A1     Jan. 29, 2015

Related U.S. Application Data

(60) Provisional application No. 61/858,762, filed on Jul. 26, 2013.

(51) Int. Cl.
    *B21C 37/15*        (2006.01)
    *B23D 75/00*        (2006.01)
    *B23D 77/00*        (2006.01)
    *F41A 21/00*        (2006.01)

(52) U.S. Cl.
CPC .............. *B23D 75/00* (2013.01); *B23D 77/006* (2013.01); *F41A 21/00* (2013.01); *Y10T 408/03* (2015.01); *Y10T 408/36* (2015.01); *Y10T 408/453* (2015.01); *Y10T 408/47* (2015.01)

(58) Field of Classification Search
CPC .... B21C 37/153; B21C 37/152; B21C 37/00; B21C 37/06; B21C 37/156; B21C 37/157; B21C 37/158; B23D 77/006; B23D 75/00; Y10T 408/553; Y10T 408/03; Y10T 408/36; Y10T 408/47
USPC ............. 42/76.01; 408/56, 57, 59, 62, 65, 66, 408/53; 89/14.7
See application file for complete search history.

(56) References Cited

U.S. PATENT DOCUMENTS

| | | | | |
|---|---|---|---|---|
| 1,455,771 A * | 5/1923 | Anderson | ............. | B21C 37/152 29/90.01 |
| 1,913,752 A * | 6/1933 | Goldman | ................ | E21B 19/08 173/151 |
| 2,092,101 A * | 9/1937 | Wickersham et al. | .......... | 82/132 |
| 2,188,929 A * | 2/1940 | William | ........................ | 144/365 |
| 2,413,022 A * | 12/1946 | Woody | .............................. | 42/78 |
| 2,810,141 A * | 10/1957 | Langston | ...................... | 408/104 |
| 3,252,201 A * | 5/1966 | Ogren | ...................... | B23Q 7/00 29/38 C |
| 3,317,216 A * | 5/1967 | Muthler | ........................ | 277/358 |
| 3,631,552 A * | 1/1972 | Ivester | ............................ | 82/113 |
| 3,737,245 A * | 6/1973 | Mater | ........................... | 408/225 |
| 3,854,838 A * | 12/1974 | Barnett et al. | ................... | 408/59 |
| 4,293,251 A * | 10/1981 | Anderson | ....................... | 408/59 |
| 4,339,857 A * | 7/1982 | Dickinson | ..................... | 29/26 A |
| 5,062,187 A * | 11/1991 | Bromley | ........................ | 29/33 T |
| 5,181,812 A * | 1/1993 | Labinka | ......................... | 408/234 |
| 5,451,126 A * | 9/1995 | Brun | .............................. | 408/1 R |
| 6,102,633 A * | 8/2000 | Uehlein-Proctor | ........... | 408/129 |
| 2007/0258783 A1* | 11/2007 | Bartlein et al. | ................ | 409/244 |
| 2009/0238652 A1* | 9/2009 | Ebert et al. | ....................... | 408/56 |

\* cited by examiner

*Primary Examiner* — Joshua Freeman
(74) *Attorney, Agent, or Firm* — The Webb Law Firm

(57) ABSTRACT

A machine for reaming a bore in a tubular member that includes a support block connected to a track, a holder connected to the support block, a reamer adapted to pass through at least a portion of the bore, a reamer drive for rotating the reamer, and a position drive coupled to the support block for moving the support block along the track. Also, a method of reaming a bore in a tubular member including providing a machine as described and a tubular member having a bore, securing the tubular member to the holder such that the longitudinal axis of the reamer is co-axial with the longitudinal axis of the bore, and powering the reamer drive and the position drive such that the reamer rotates and the support block moves along the track. The tubular member may be a gun barrel.

23 Claims, 15 Drawing Sheets

MACHINE TO MANUFACTURE GUN BARRELS AND METHOD OF USING

CROSS REFERENCE TO RELATED APPLICATIONS

The present application claims priority from U.S. Provisional Patent Application No. 61/858,762, filed on Jul. 26, 2013, which is incorporated herein by reference in its entirety.

BACKGROUND OF THE INVENTION

1. Field of the Invention

The present invention relates to a machine and a method for reaming a bore in a tubular member. More particularly, it relates to an electrically controlled and actuated machine for reaming gun barrels and further finishing the bore of the barrels of handguns, rifles, and shotguns.

2. Description of Related Art

A gun barrel is a tube through which a controlled explosion or rapid expansion of gases are released in order to propel a projectile out of the end of the gun barrel. To be effective a gun barrel must be able to hold the expanding gas produced by the propellants to ensure that the projectile is propelled at sufficient velocity. Referring to FIG. 1, a gun barrel 10 defining a bore 12 is shown. Ideally, the bore 12 of the gun barrel 10 is perfectly straight, as shown, with no deviations in diameter; however, it is very difficult to produce gun barrels with the extremely straight and highly honed bores that result in optimum performance characteristics. Therefore, perfectly straight and perfectly honed bores while ideal are not currently achievable, and some deviations 14 in the gun barrel bore 12, shown exaggerated in phantom, are present in every gun barrel 10.

FIG. 2 shows a cross-sectional view of a rifled gun barrel 10 which has helical grooves 15 in the bore 12 to impart a spin to the projectile along its longitudinal axis. The bore 12 has a minor diameter 16 and a major diameter 18. The barrel 10 has a minor bore diameter 16 that is generally equal to the caliber of the finished rifled barrel 10. For example, a typical finished .30 caliber rifle barrel constructed to precision standards has a major diameter 18 (groove-to-groove) of 0.308 inches and a minor diameter 16 (land-to-land) of 0.300 inches. In another example, a typical finished twelve gauge smoothbore shotgun barrel constructed to precision standards has a bore diameter of 0.729 inches.

In spite of the great care given to making straight holes, gun barrel makers normally further process the bore 12 following drilling to smooth the surface, correct minor variations in straightness, and establish the final bore diameter 16.

A reamer is used to reduce the roughness inherent in the drilled bore. A reamer includes a long cutting tool with its working edges on the sides. The maximum diameter of the reamer is typically the same as the final bore diameter. To assure proper alignment and straightness of the cutting tool as it passes through the barrel, the length of the reamer is much greater than its diameter. A typical reamer for refining the bores of gun barrels will have a length that is ten to twenty times its diameter for precision alignment. Because the reamer is required to remove very little metal, the working edges are finely honed.

However, although the inner surface of the barrel bore is significantly smoothed by reaming, residual markings that may ultimately be passed to a fired projectile can remain.

In an attempt to produce perfectly straight and perfectly honed bores, many gun barrel reamers are purposely built to produce a particular caliber gun barrel with a particular outside diameter and a particular length, thereby limiting the range of barrels that can be produced from a particular gun barrel reamer.

Furthermore, in many gun barrel reamers, the speed of rotation of the reamer and the movement speed of the barrel over the reamer are often not constant throughout the reaming process which produces bores that are less straight and less well honed than possible.

In view of the above, there is a need for a barrel reaming machine that can ream gun barrels with a variety of lengths and outside diameters and is capable of producing a variety of bore diameters that are straight and finely honed in these gun barrels.

SUMMARY OF THE INVENTION

The present invention is directed to a machine for reaming a bore in a tubular member including a support block slidably connected to a track, a holder connected to the support block and adapted to hold a tubular member, a reamer adapted to pass through at least a portion of the bore in the tubular member when the tubular member is held in the holder, a reamer drive for rotating the reamer about its longitudinal axis, and a position drive coupled to the support block for moving the support block along the track. The position drive may be coupled to a sprocket that moves a chain coupled to the support block. The reamer may include a shaft having a reamer head disposed at one end, and the longitudinal axis of the reamer may be co-axial with the longitudinal axis of the bore of the tubular member. The holder may be adjustable to secure tubular members having different outside diameters while maintaining the longitudinal axis of the reamer co-axial with the longitudinal axis of the bore of the tubular member.

The machine may further include a reamer stabilizer attached to the support block and adapted to receive the shaft of the reamer to stabilize the reamer as it passes through the bore of the tubular member. The reamer stabilizer may define a circular aperture for receiving a portion of the shaft of the reamer.

The machine may further include a rotating oil transfer coupling connected between the reamer drive and the reamer, wherein the rotating oil transfer coupling directs cutting oil through a hollow shaft of the reamer.

The machine may further include a controller for controlling the reamer drive and the position drive.

The machine may also include a plurality of independently controlled stations each including a support block, a holder, a reamer, a reamer drive, and a position drive, the machine being configured to ream a plurality of tubular members of different diameters and lengths concurrently. Each station may have a controller to control the reamer drive and the position drive of that station, independent of the reamer drives and the position drives of the other stations.

The tubular member may be a gun barrel.

The present invention is also directed to a method of reaming a bore in a tubular member. A tubular member having a bore and at least one station comprising a support block slidably connected to a track, a holder connected to the support block and adapted to hold a tubular member, a reamer adapted to pass through the bore in the tubular member when the tubular member is held in the holder, a reamer drive for rotating the reamer about its longitudinal axis, a position drive mechanically coupled to the support block for moving the support block along the track, and a controller for controlling the reamer drive and the position drive are provided. The tubular member is secured to the holder such that the longitudinal axis of the reamer is co-axial with the longitudinal axis of the bore of the tubular member. A signal is then sent from the controller to power the reamer drive and the position drive such that the reamer drive causes the reamer to rotate and the position drive causes the support block to move along the track. Movement of the support block along the track causes the rotating reamer to be received in and pass through at least a portion of the bore of the tubular member. The position drive may be coupled to a sprocket that moves a chain coupled to the support block.

The step of securing the tubular member to the holder may include adjusting at least a portion of the holder to move the position of the longitudinal axis of the bore of the tubular member with respect to the longitudinal axis of the reamer.

At least one of the movement speed of the support block and the speed of rotation of the reamer may be constant when the reamer is in contact with the tubular member.

Alternatively, a plurality of stations may be provided. Control of the reamer drive and the position drive of each station may be independent of control of the reamer drives and the position drives of the other stations.

The tubular member may be a gun barrel.

Accordingly, it is an object of the present invention to provide a machine and a method of using said machine to produce straight and finely honed bores in tubular members of different dimensions.

BRIEF DESCRIPTION OF THE INVENTION

Figure 3:
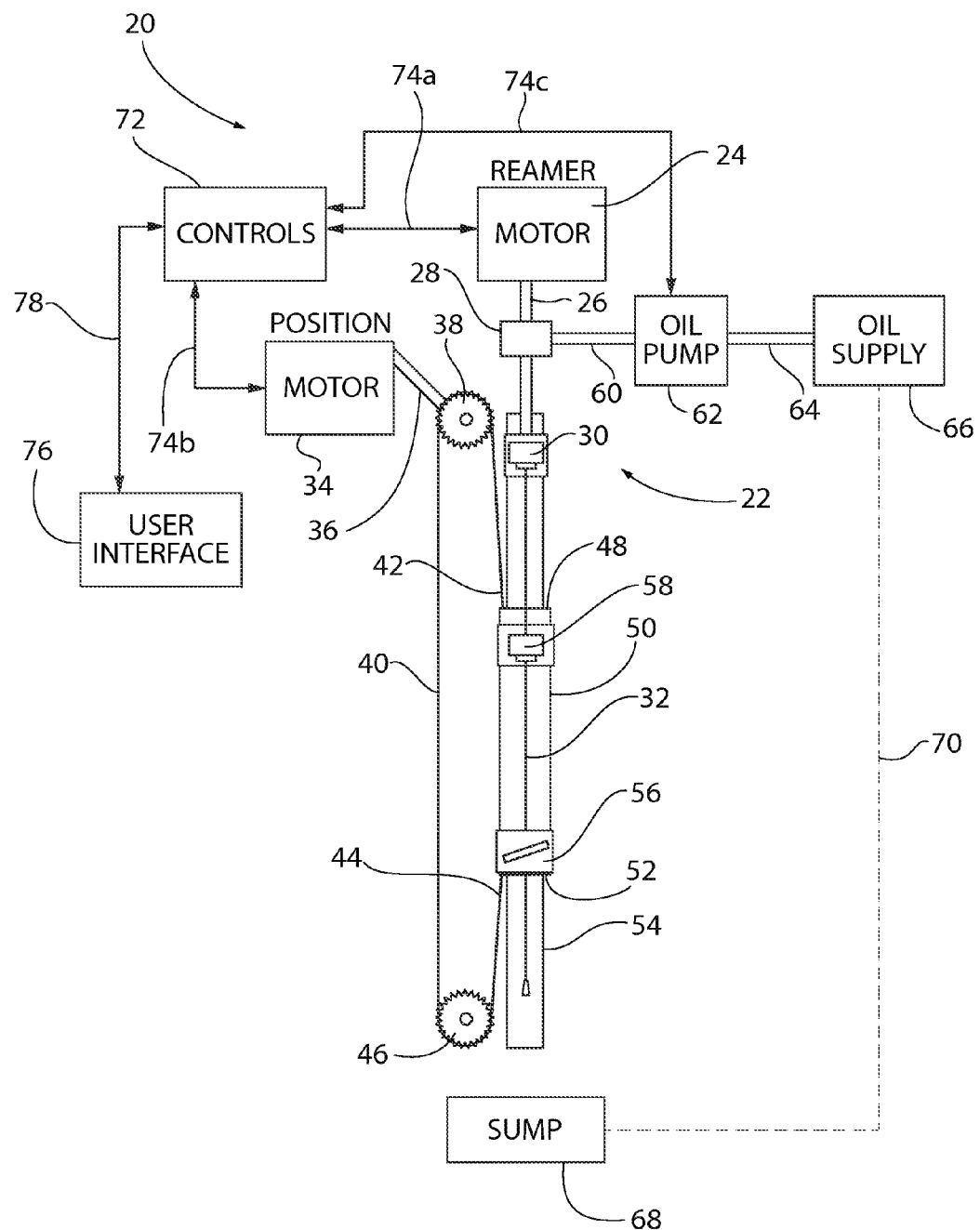
FIG. 3 is a schematic overview of a machine for reaming a bore in a tubular member in accordance with the present invention.
Figure 4:
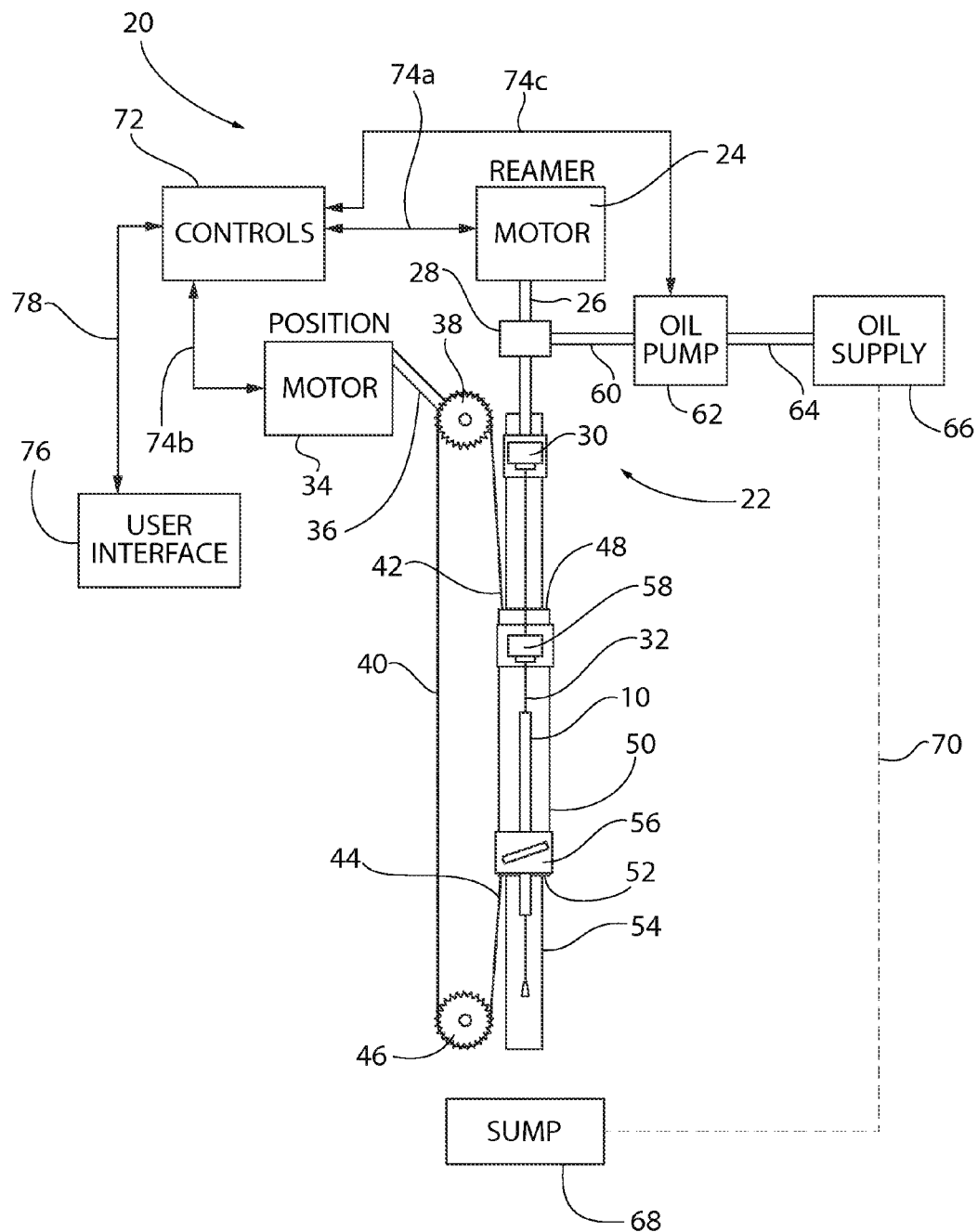
FIG. 4 is a schematic overview of the machine for reaming a bore in a tubular member shown in FIG. 1 with a gun barrel secured to the holder.

Referring to FIGS. 3 and 4, there is shown a machine 20 for reaming a bore in a tubular member including a station 22. The station 22 includes a reamer motor 24 for rotating a reamer motor drive shaft 26 that is mechanically coupled to a rotating oil transfer coupling 28. The rotating oil transfer coupling 28 is coupled to a reamer chuck 30 for receiving and securing a reamer 32.

The machine 20 further includes a position motor 34 for rotating a position motor drive shaft 36 which is mechanically coupled to a drive sprocket 38. A drive chain 40 having a first end 42 and a second end 44 is coupled to the drive sprocket 38 and an idler sprocket 46. The first end 42 of the drive chain 40 is attached to a top end 48 of a support block 50 and the second end 44 of the drive chain 40 is attached to a bottom end 52 of the support block 50, the support block 50 being slidably coupled to a track 54. Rotation of the position motor drive shaft 36 rotates the drive sprocket 38 which moves the drive chain 40 which moves the support block 50 along the track 54. This motorized sliding of the support block 50 on the track 54 provides the ability to define and maintain a fixed slide speed through the reaming process and to positively drive the reaming tool independent of bore resistance. Programmable stop positions for the support block 50 for loading of the barrel and completion of reaming allows for reaming various length barrels and optimizes process time.

The support block 50 includes a holder 56 adapted to receive and secure the gun barrel 10 in a vertically oriented position and a reamer stabilizer 58 for limiting movement, known as run-out, of the reamer 32 attached thereto.

The rotating oil transfer coupling 28 receives an oil delivery line 60 which delivers oil from an oil pump 62. The oil pump 62 receives an oil supply line 64 which supplies oil from an oil supply 66. It is preferable that oil, particularly cutting oil, is supplied to the cutting edge or edges of the reamer 32 during reaming to prevent excess heat build up which can warp or otherwise damage the gun barrel 10 as well as the reamer 32. The oil supply 66 may be any suitable oil reservoir or container. The oil used at each station 22 is captured in a sump 68. The oil is then filtered to remove metal debris and transferred back to the oil supply 66 for reuse via an oil recycle line 70.

Controls 72 control the operation of the reamer motor 24, the position motor 34, and the oil pump 62, via electrical connections 74 $a$, 74 $b$, and 74 $c$, respectively. The controls 72 are connected to a user interface 76 via a communication link 78. In operation, each station 22 can operate independently to move the gun barrel 10 over the reamer 32 to ream the bore 12 of the gun barrel 10. To achieve the best results, the reamer motor 24 should rotate the reamer 32 at a constant speed, while (i.e., simultaneously) the position motor 34 moves the support block 50 at a constant speed, thereby moving the gun barrel 10 over the reamer 32 at a constant speed during reaming of the gun barrel 10.

Figure 5:
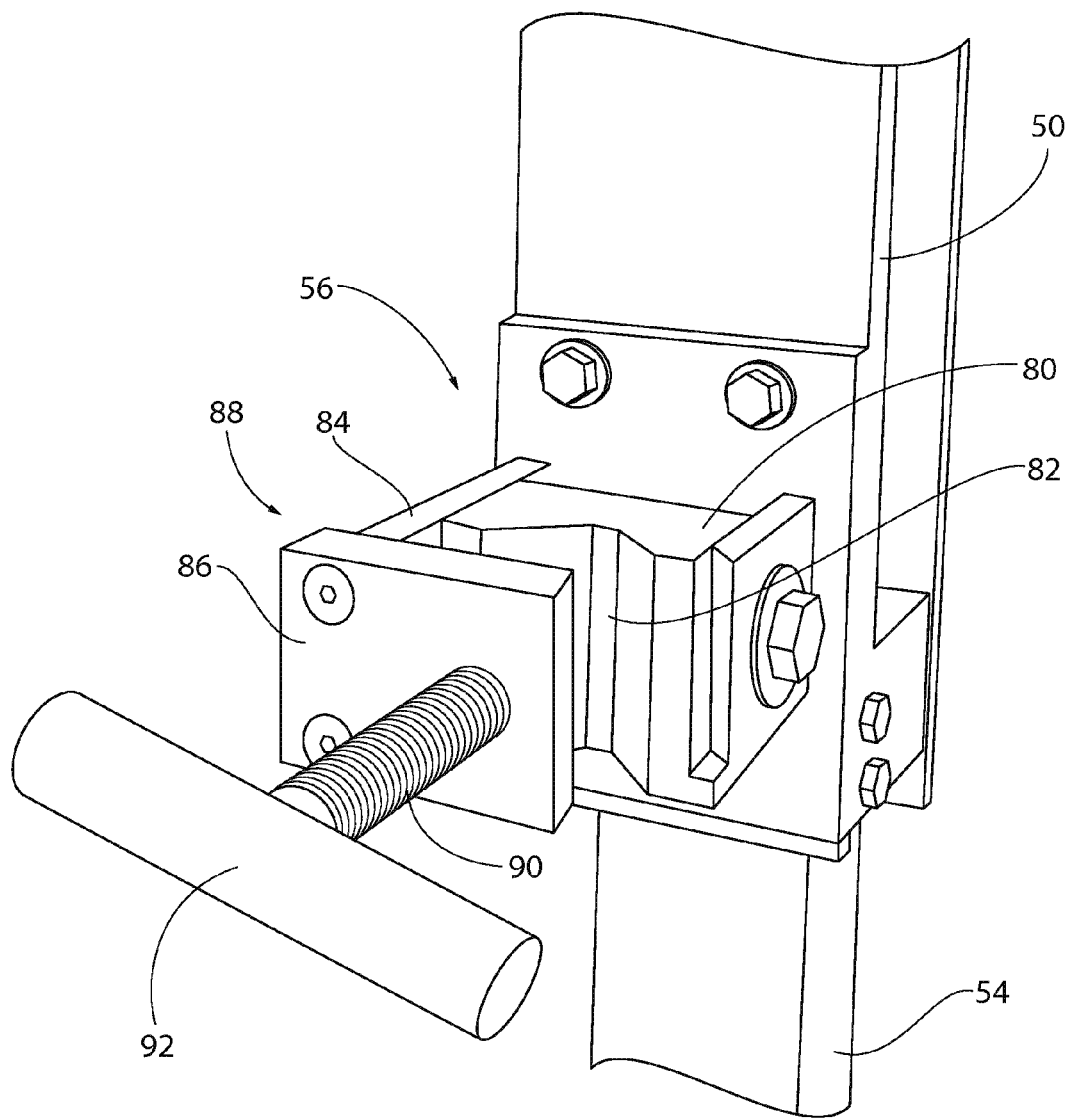
FIG. 5 is a perspective view of a holder in accordance with the present invention.
Figure 6:
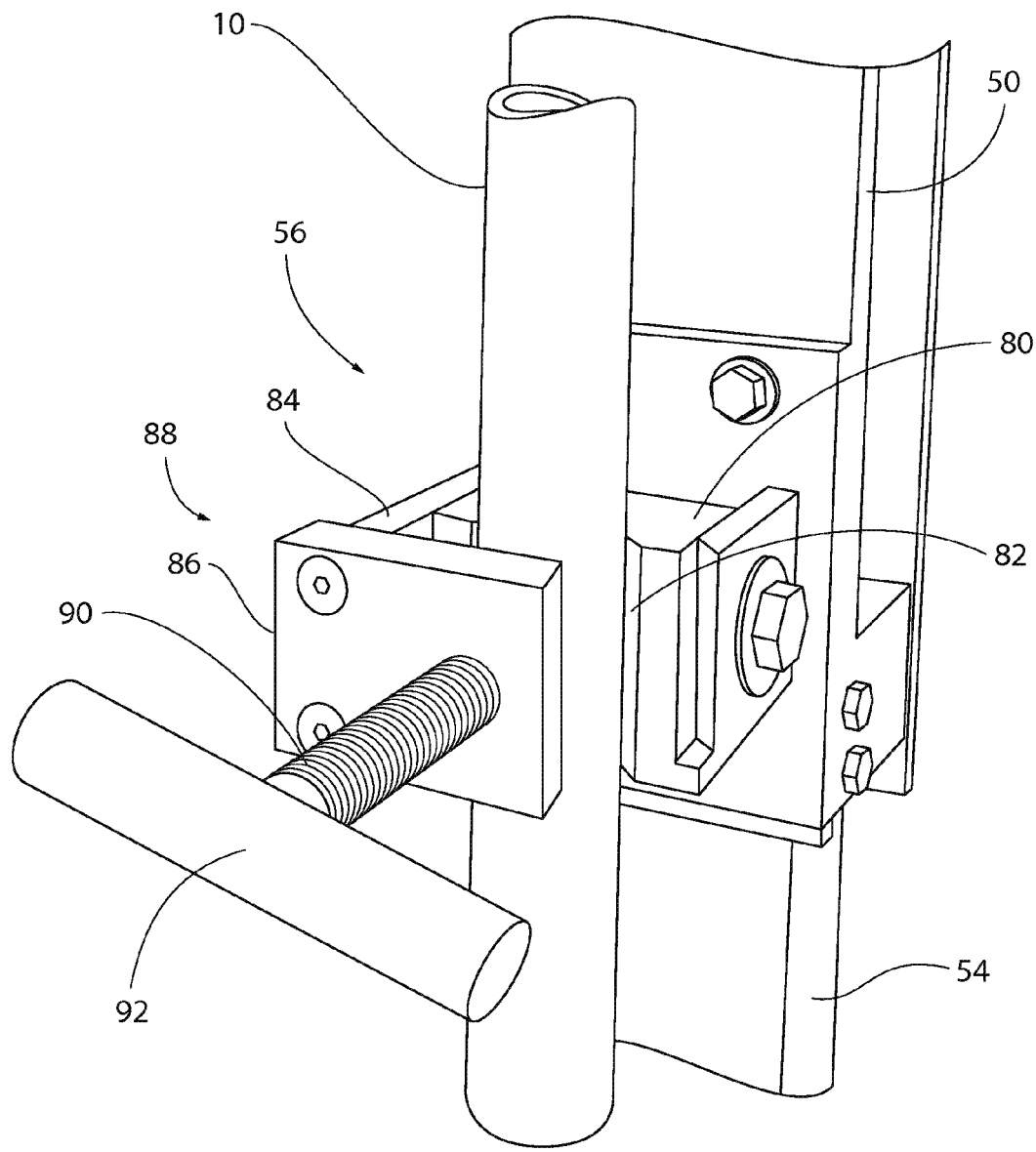
FIG. 6 is a perspective view of the holder shown in FIG. 5 with a gun barrel secured to the holder.

FIGS. 5 and 6, show the holder 56 disposed on the support block 50. The support block 50 is shown slidably coupled to the track 54. The holder 56 includes a removably attached cradle 80 having a trough 82 for receiving the gun barrel 10. Different sized cradles 80 are used to receive gun barrels 10 of different diameters to assure that the central longitudinal axis of the barrel is aligned with the longitudinal axis of the reamer. The trough 82 may have a V-shaped profile or a truncated V-shaped profile as shown. Alternatively, the trough 82 may have a stepped profile. The holder 56 includes a side plate 84 attached to the support block 50 and a front plate 86, which form an L-shaped member 88 that is configured to partially surround the barrel 10 when it is positioned in the trough 82 of the cradle 80. The front plate 86 defines a threaded hole which receives a screw 90 with a handle 92. The screw 90 contacts the gun barrel 10 to secure it between the screw 90 and the cradle 80. The gun barrel 10 can be secured and released from the holder 56 by turning the screw 90 via the handle 92.

Figure 7:
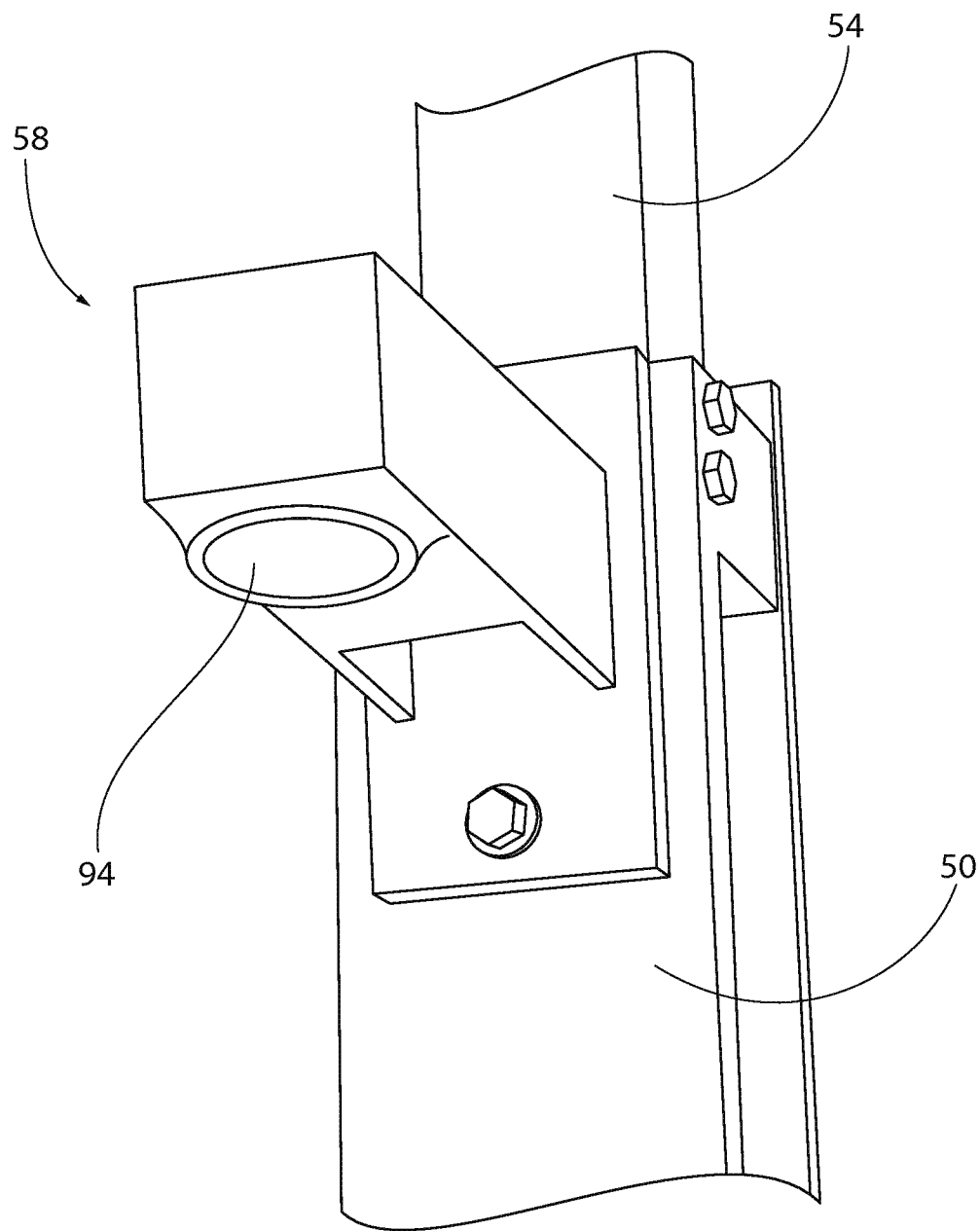
FIG. 7 is a perspective view of a reamer stabilizer in accordance with the present invention.
Figure 8:
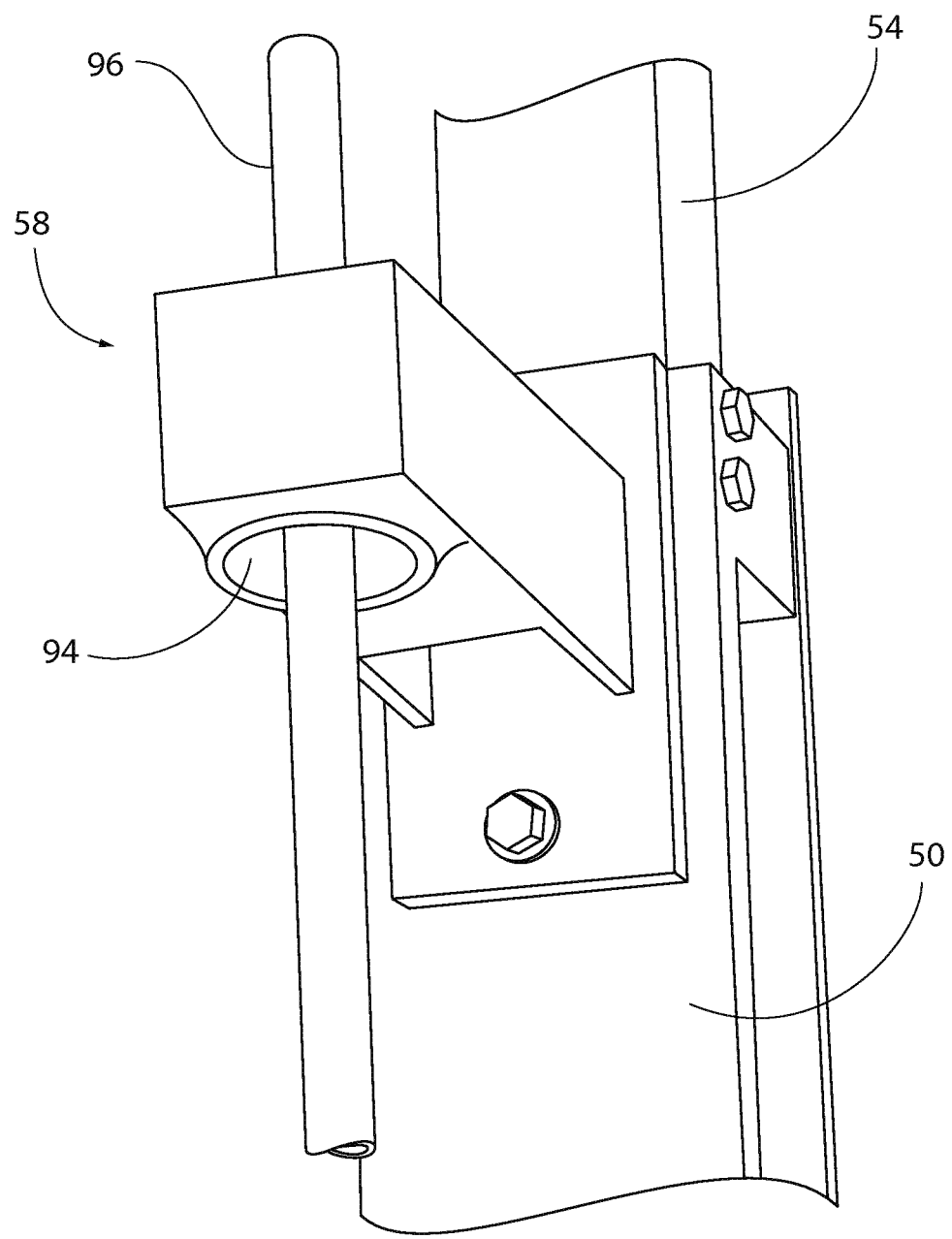
FIG. 8 is a perspective view of the reamer stabilizer shown in FIG. 7 with a shaft of a reamer passing therethrough.

FIGS. 7 and 8 show the reamer stabilizer 58 which is attached to the support block 50 shown slidably coupled to the track 54. The reamer stabilizer 58 includes a circular aperture 94 passing therethrough. The circular aperture 94 receives a shaft 96 of the reamer 32 and prevents the reamer 32 from moving in a transverse direction to an off-centered position relative to the axis of the bore of the gun barrel 10, also known as reamer run-out. That is to say, the circular aperture 94 of the reamer stabilizer 58 constricts the movement of the shaft 96 of the reamer 32 in directions that are perpendicular to the axis of the bore of the gun barrel 10.

Figure 1:
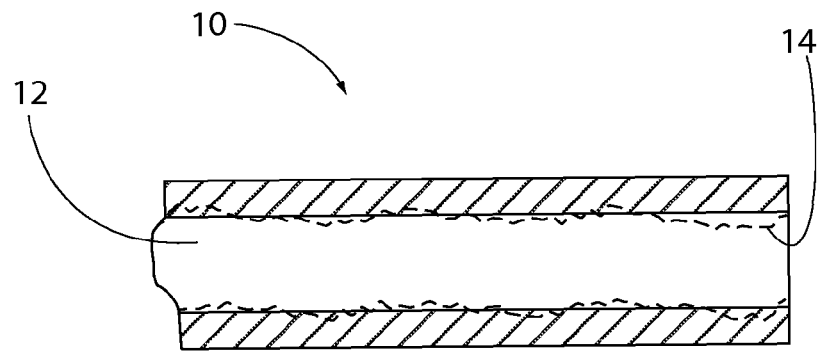
FIG. 1 is a schematic cross-sectional view of an exaggerated typical gun barrel bore in phantom superimposed over a cross section of an ideal gun barrel with an ideal gun barrel bore.
Figure 2:
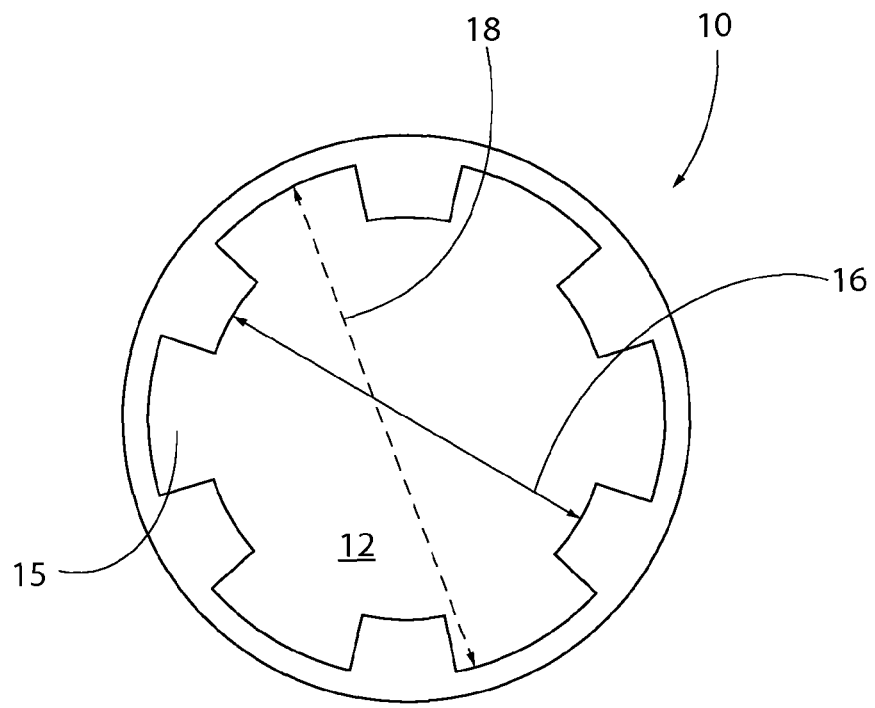
FIG. 2 is a cross-sectional view of a rifled gun barrel.
Figure 9:
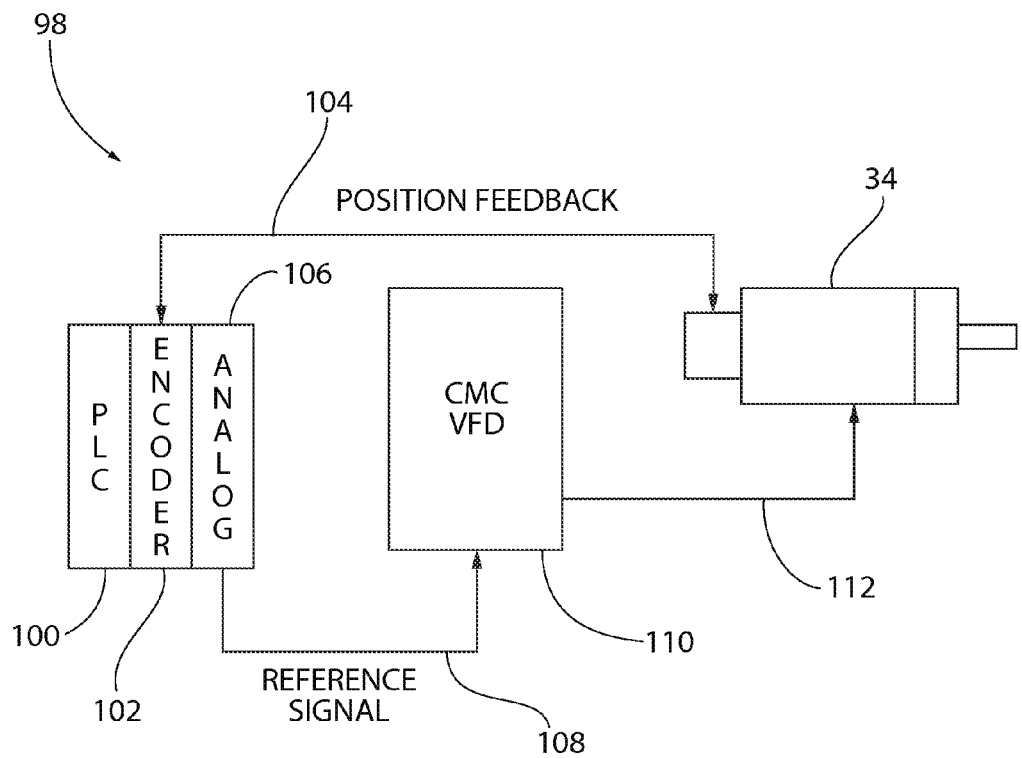
FIG. 9 is a schematic of a position drive control in accordance with the present invention.

FIG. 9 shows a schematic of a position drive control 98 which is part of the controls 72. The position drive control 98 includes a programmable logic controller 100 in electrical communication with an encoder 102. The encoder 102 may be a rotary encoder or, more particularly, a quadrature encoder. Examples of quadrature encoders include, North-Star™ Series H56 and Dynapar™ Series HC26 both commercially available from Dynapar™, a division of Danaher Corporation. The encoder 102 receives a position feedback signal 104 from the position motor 34, which indicates the orientation of the position motor drive shaft 36 and also, by relation, the position of the support block 50 (shown in FIGS. 1 and 2). The encoder 102 is electronically coupled to an analog output 106 which sends a reference signal 108 to a common-mode current variable-frequency drive 110. The common-mode current variable-frequency drive 110 then controls the operation of the position motor 34 via a command line 112. The arrangement of the position drive control 98 as shown allows the position motor 34 to be precisely controlled regarding the speed of rotation and the amount of rotation of the position motor drive shaft 36, and also by relation to the position of the support block 50 independent of the load on the position motor 34.

Referring to FIGS. 10-13, the reamer motor drive shaft 26 is mechanically coupled to the rotating oil transfer coupling 28 which is then coupled to the reamer chuck 30 as shown. The rotating oil transfer coupling 28 receives the oil delivery line 60 which delivers oil from the oil pump 62. The reamer chuck 30 is a quick-release chuck as shown to facilitate quick connection and disconnection of the reamer 32 from the reamer chuck 30 without the need for tools, such as a chuck key. The chuck 30 is fixedly connected to a bottom end 114 of a spindle 116 of the rotating oil transfer coupling 28. The spindle 116 is fixedly connected to the chuck 30 via a spindle extension 118 and a reamer shaft end seal 120.

Figure 10:
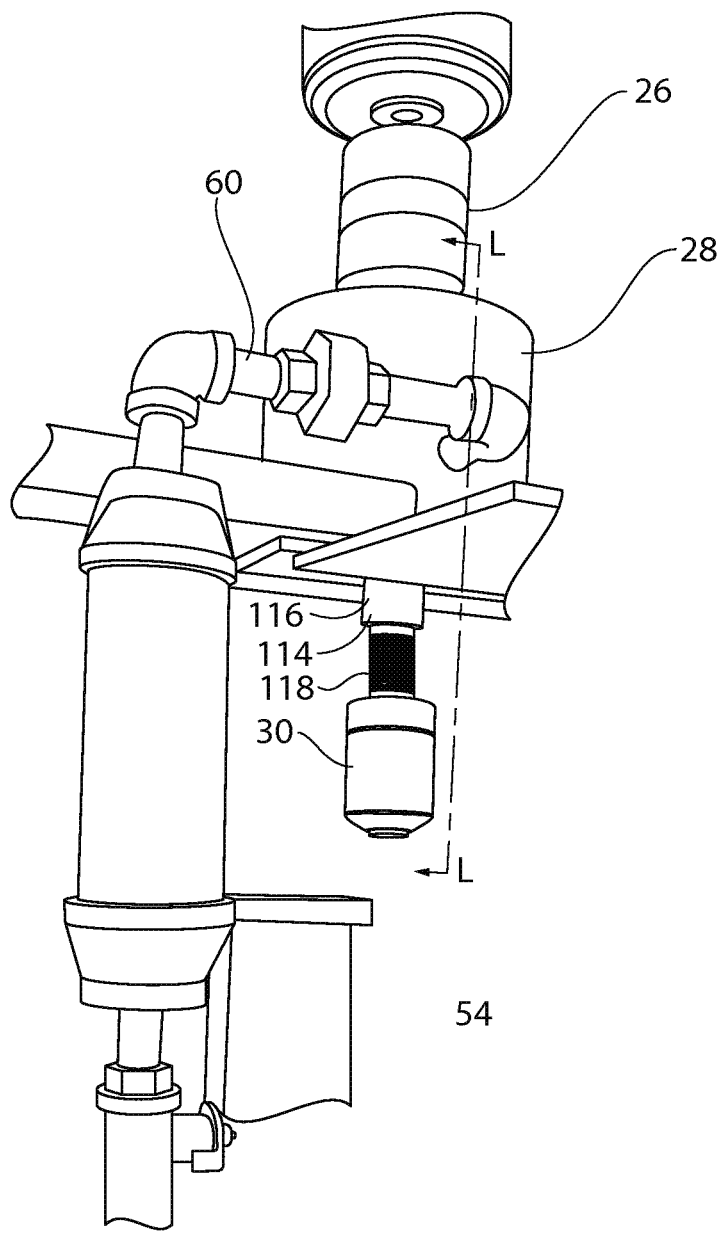
FIG. 10 is a perspective view of a reamer drive, a rotating oil transfer coupling, a reamer chuck, and an oil supply line in accordance with the present invention.
Figure 11:
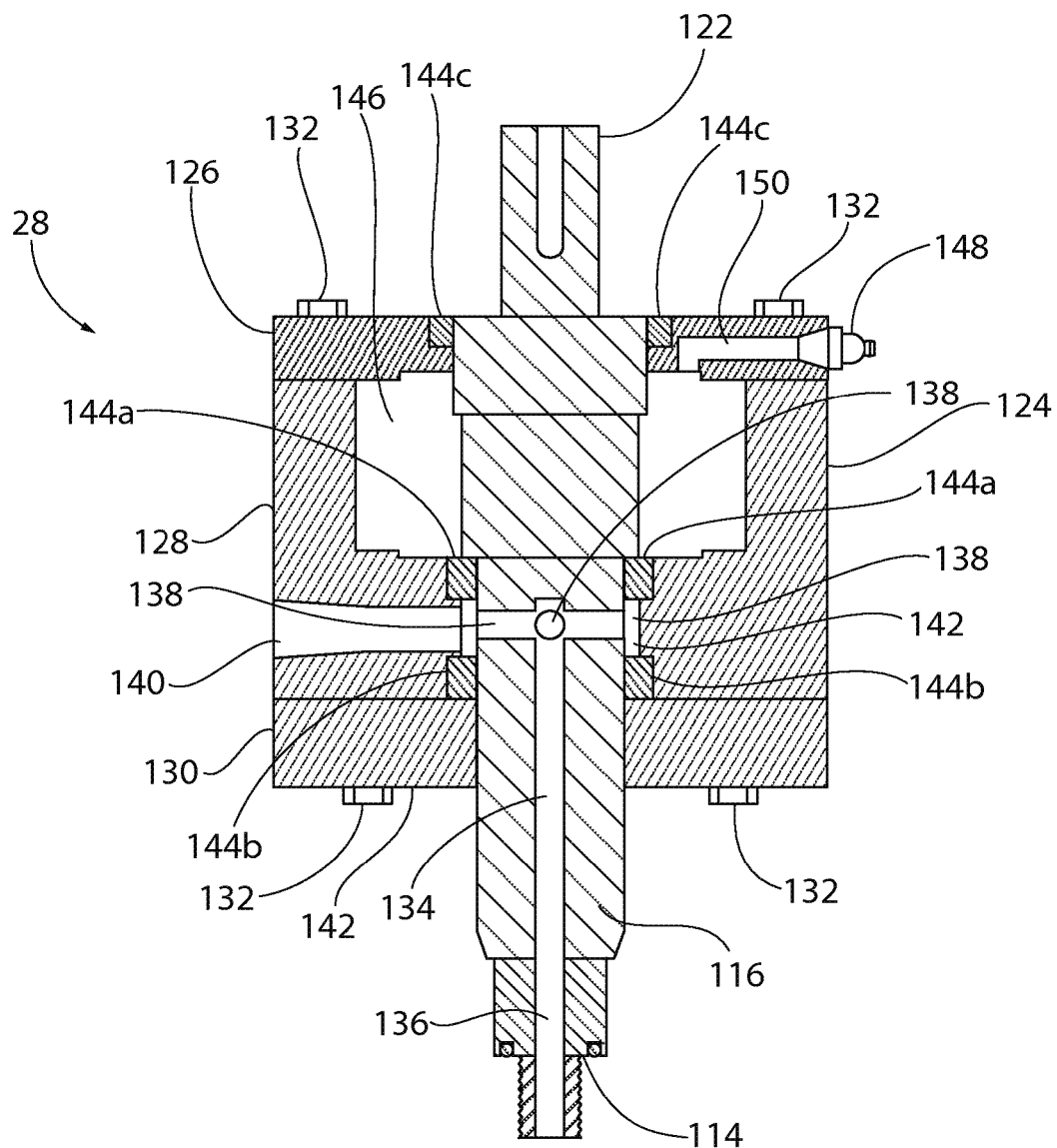
FIG. 11 is a cross-sectional view of the rotating oil transfer coupling along line L-L of FIG. 10.

FIG. 11 is a cross-sectional view of the rotating oil transfer coupling 28 along line L-L of FIG. 10. The rotating oil transfer coupling 28 includes the spindle 116 having a top end 122 and a bottom end 114. The spindle 116 passes through a housing 124 of the rotating oil transfer coupling 28. The housing 124 includes a top retainer plate 126, a central body 128, and a bottom retainer plate 130 which are secured together by bolts 132. The spindle 116 further includes an oil passageway 134 which includes a downward passageway 136 connected to a plurality of upper oil receiving passageways 138 which receive oil from oil delivery line inlet 140. The oil delivery line inlet 140 receives oil delivery line 60 (shown in FIGS. 2, 3, and 10) and allows oil to flow into an annular chamber 142 defined by the housing 124, the spindle 116, and two seals 144a, 144b. Oil then flows from the annular chamber 142 into the plurality of upper oil receiving passageways 138 and then to the downward passageway 136 to eventually flow to the reamer 32 (shown in FIGS. 3 and 4). A grease chamber 146 is defined by the housing 124, specifically, the grease chamber 146 is defined by the top retainer plate 126, the central body 128, and the spindle 116. Grease may be periodically supplied to the grease chamber 146 via a grease fitting 148 and a grease supply channel 150. Seals 144a and 144c aid in keeping grease within the grease chamber 146. The reamer motor 24 for rotating the reamer motor drive shaft 26 is mechanically coupled to the rotating oil transfer coupling 28 via the top end 122 of the spindle 116.

Figure 12:
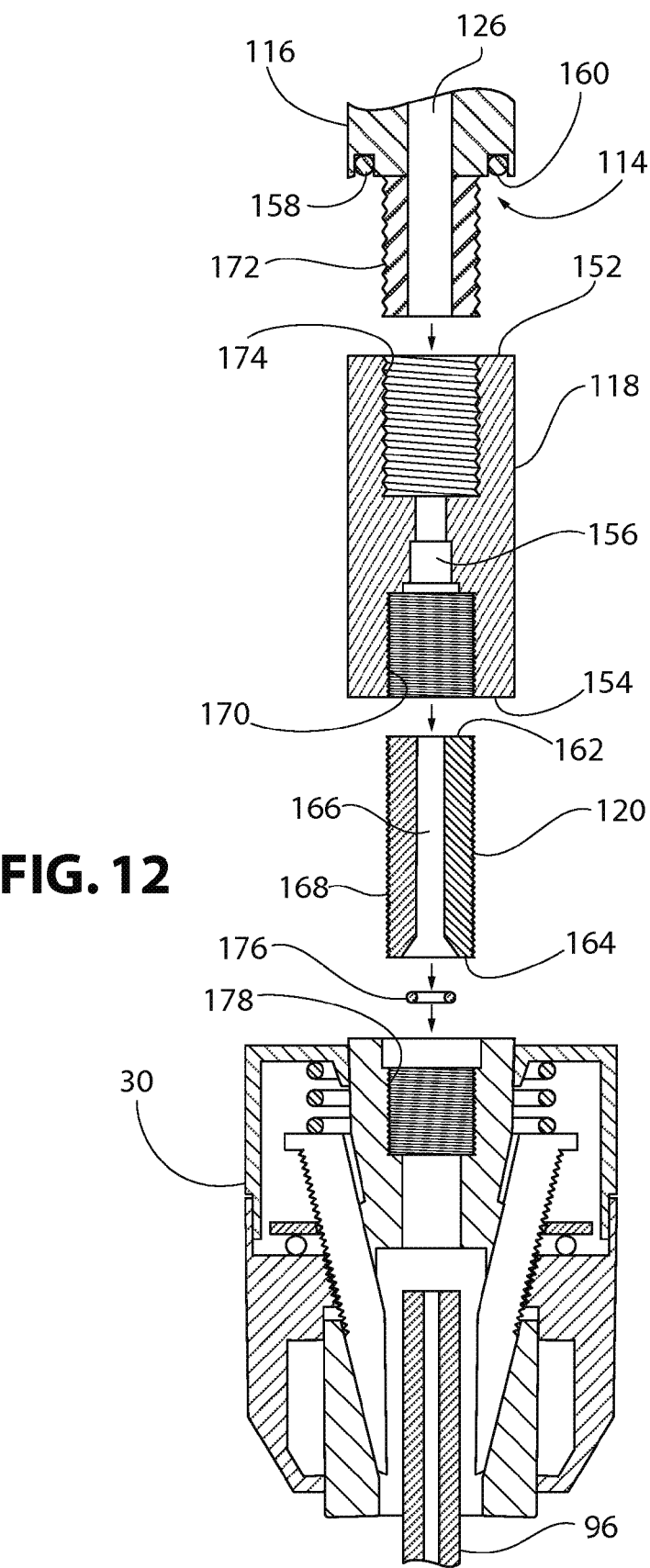
FIG. 12 is an exploded cross-sectional view of a portion of the rotating oil transfer coupling, a spindle extension, a reamer shaft end seal, an O-ring seal, and the reamer chuck along line L-L of FIG. 10.
Figure 13:
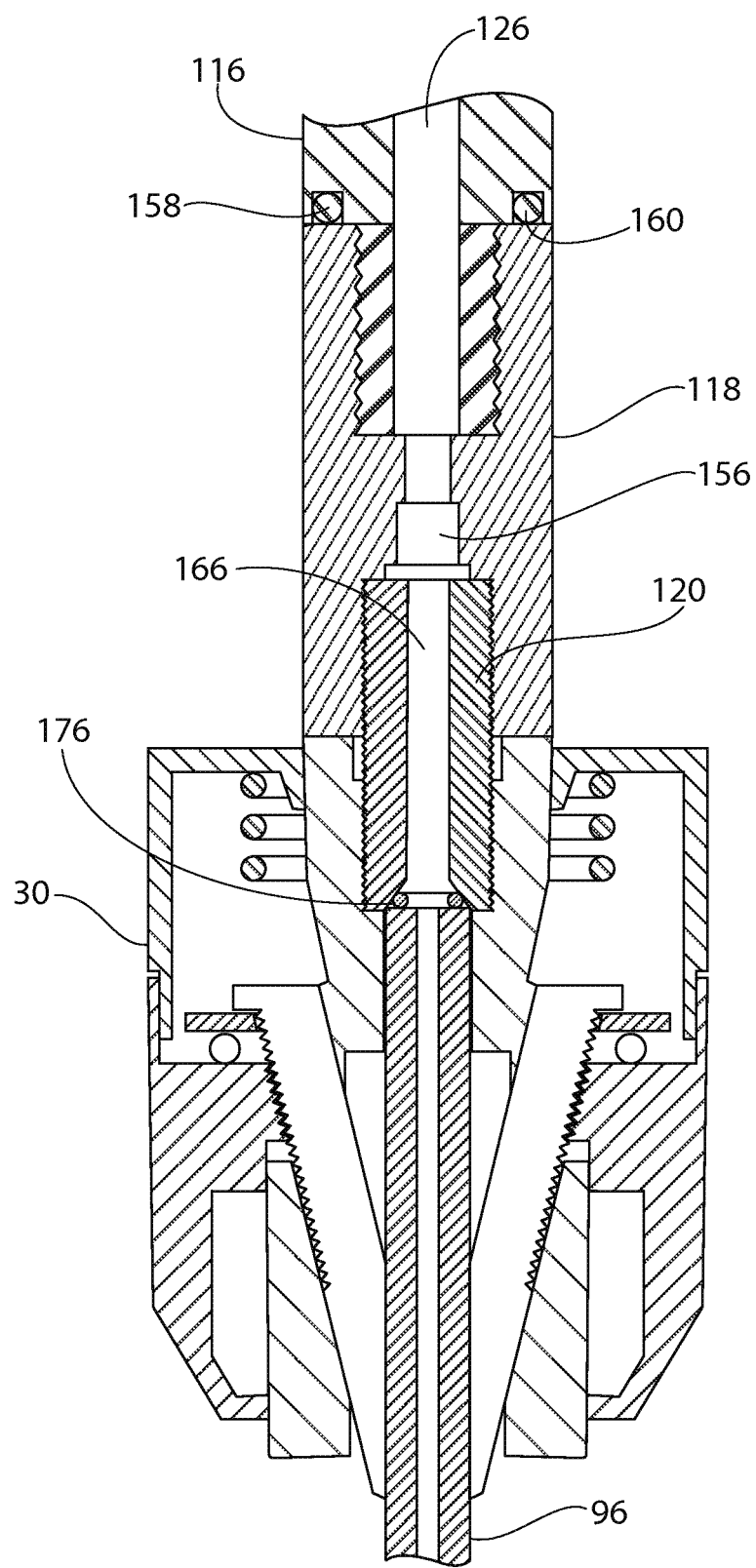
FIG. 13 is a cross-sectional view of a portion of the rotating oil transfer coupling, a spindle extension, a reamer shaft end seal, an O-ring seal, and the reamer chuck along line L-L of FIG. 10.

Referring to FIGS. 12 and 13, the spindle extension 118, having a spindle receiving end 152 and a reamer shaft seal receiving end 154, defines a passageway 156 extending from the spindle receiving end 152 to the reamer shaft seal receiving end 154. The spindle receiving end 152 is connected to the bottom end 114 of the spindle 116. An O-ring 158 may be disposed in an O-ring groove 160 in the bottom end 114 of spindle 116 for sealing the connection between the bottom end 114 of the spindle 116 and the spindle receiving end 152 of the spindle extension 118. The bottom end 114 of spindle 116 is connected to the spindle receiving end 152 of the spindle extension 118 via external threads 172 of the spindle 116 engaging internal threads 174 of the spindle extension 118.

The reamer shaft end seal 120, having a spindle extension receiving end 162 and a reamer receiving end 164, defines a passageway 166 extending from the spindle extension receiving end 162 to the reamer receiving end 164. The spindle extension receiving end 162 of the reamer shaft end seal 120 is connected to the reamer shaft seal receiving end 154 of the spindle extension 118 via external threads 168 of the reamer shaft end seal 120 and internal threads 170 of the spindle extension 118. The reamer receiving end 164 receives an O-ring seal 176 for creating a fluid tight seal when engaged with the shaft 96 of the reamer 32.

Alternatively, the spindle 116, the spindle extension 118, and the reamer shaft end seal 120 may be connected in another manner or may be formed as a single element.

The chuck 30 is connected to the reamer shaft end seal 120 via internal threads 178 of the chuck 30 which engage the external threads 168 of the reamer shaft end seal 120.

Figure 14:
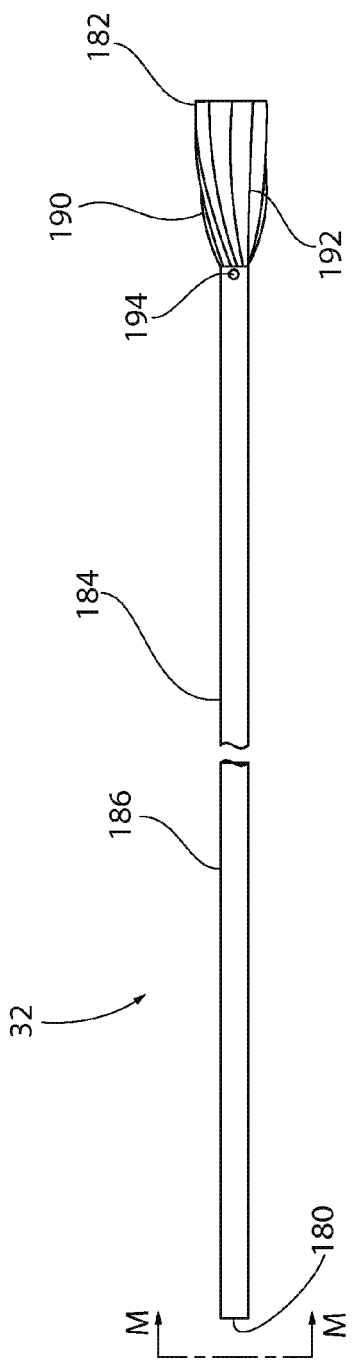
FIG. 14 is a plan view of a reamer in accordance with the present invention.
Figure 15:
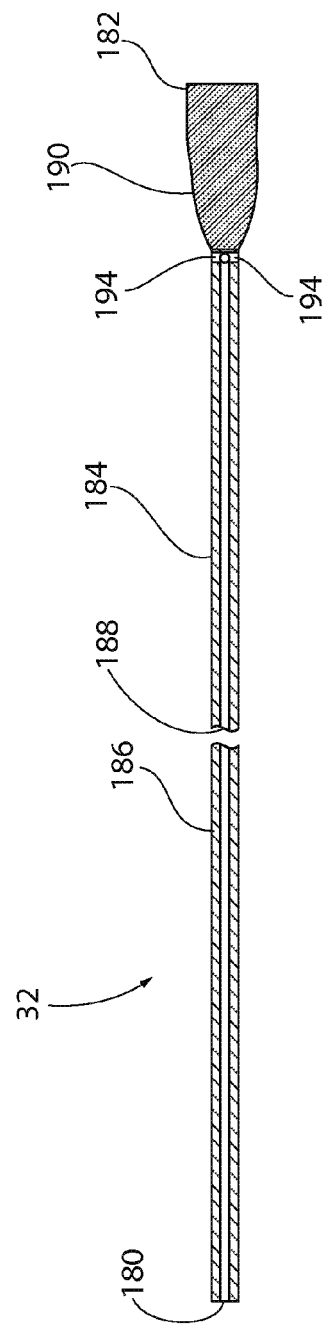
FIG. 15 is a cross-sectional view of the reamer along line M-M of FIG. 12.

A shown in FIGS. 14 and 15, the reamer 32 includes a chuck engaging end 180, a reaming end 182, and a hollow shaft 184 having a sidewall 186 defining an oil channel 188 therein. A reaming head 190 including a cutting edge 192 is disposed at the reaming end 182 of the reamer 32. The oil channel 188 extends from the chuck engaging end 180 to the reaming head 190 and is configured to supply oil from the reamer shaft end seal 120 to oil delivery apertures 194 located at the reamer end 182 of the reamer 32. The oil delivery apertures 194 extend from the oil channel 188 to an outside surface of the reamer 32 for delivery of oil to the reaming head 190 and the cutting edge 192.

Figure 16:
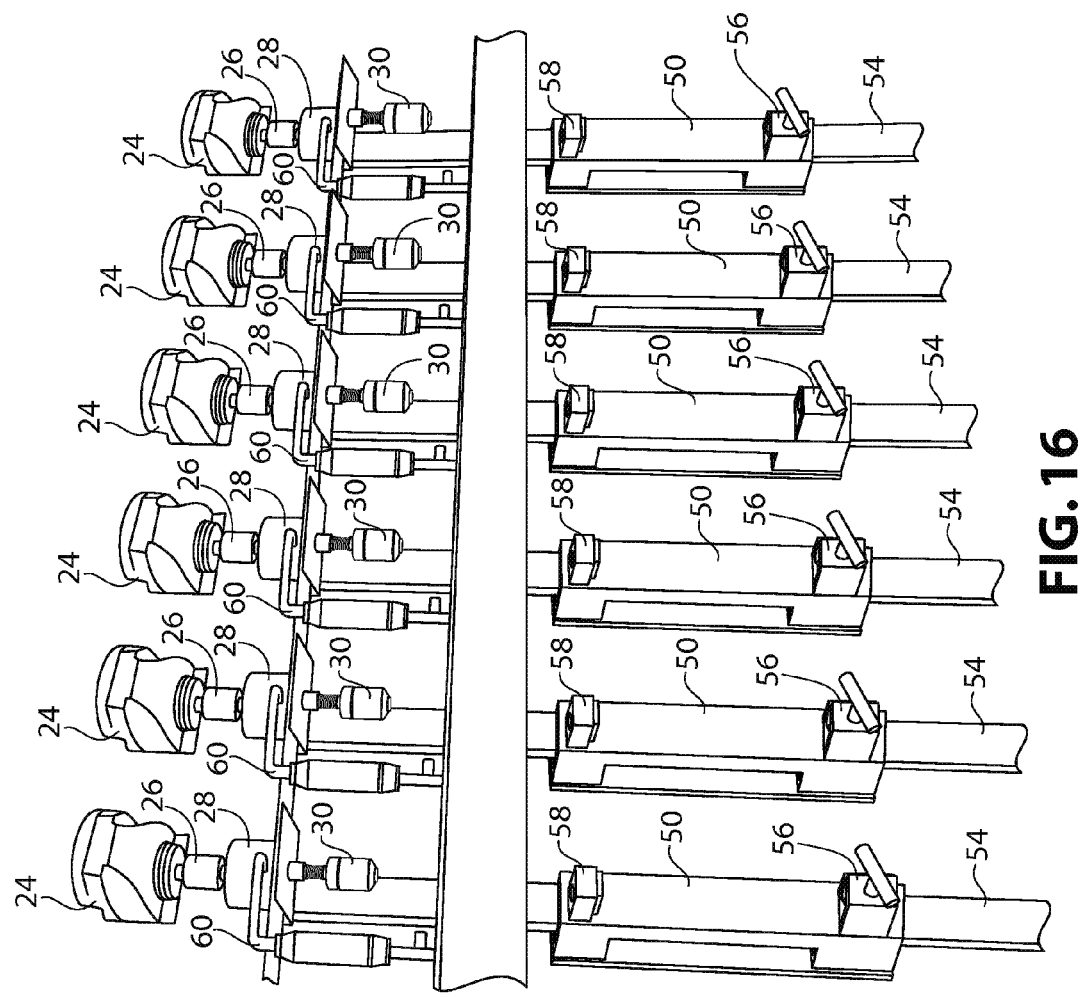
FIG. 16 is a perspective view of a machine for reaming a bore in a tubular member with a plurality of stations in accordance with the present invention.

FIG. 16, shows a machine for reaming a bore in a tubular member that includes a plurality of the stations 22. Each of the stations 22 may be configured for independent operation, which may be accomplished by a central set of controls for controlling a plurality of stations or individual controls for each station. The rotation of the reamer motor 24 and the position motor 34 for each station may be individually controlled with respect to the other stations such that different length and diameter barrels, requiring different processing conditions, can be processed simultaneously on the plurality of stations. While six stations 22 are shown, the machine for reaming a bore in a tubular member could be constructed with more or fewer stations 22.

Figure 17:
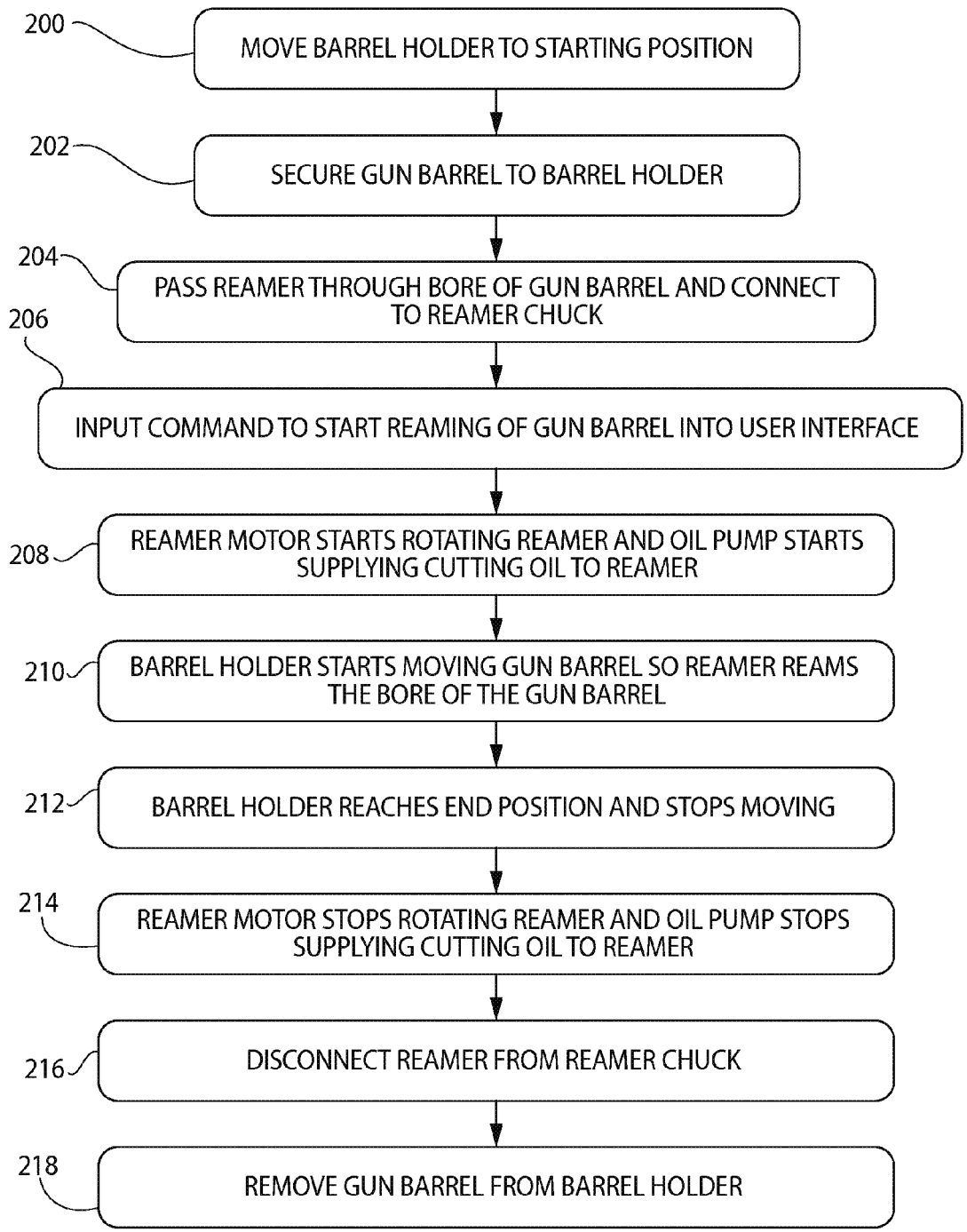
FIG. 17 is a flow diagram of a method of manufacturing a gun barrel in accordance with the present invention.

In operation (FIG. 17), the holder 56 is moved to a starting position, step 200, and the gun barrel 10 is secured to the holder 56, step 202. The shaft 96 of the reamer 32 is then inserted through the bore of the gun barrel 10 and connected to the reamer chuck 30, step 204. A command to start reaming of the gun barrel 10 is input into the user interface 76, step 206, at which point, the controls 72 start the rotation of the reamer motor 24 to rotate the reamer 32 and start the oil pump 62 to pump oil to the reamer 32, step 208. Then, the controls 72 start the rotation of the position motor 34 such that the holder 56 starts moving the gun barrel 10 allowing the reamer 32 to ream the bore of the gun barrel 10, step 210. When holder 56 reaches an end position, it stops moving, step 212. Subsequently the reamer motor 24 stops rotating the reamer 32 and the oil pump 62 stops supplying oil to the reamer 32, step 214. The reamer 32 is then disconnected from the reamer chuck 30, step 216. Finally, the reamed gun barrel 10 is removed from the holder 56, step 218. The above steps may then be repeated to ream additional gun barrels.

While the description of the present invention has been directed to manufacturing gun barrels, the specific designs discussed can be used to ream any tubular member having a central bore.

Although the invention has been described in detail for the purpose of illustration based on what is currently considered to be the most practical and preferred embodiments, it is to be understood that such detail is solely for that purpose and that the invention is not limited to the disclosed embodiments but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A machine for reaming a bore in a member comprising:
   a support block slidably connected to a track;
   a holder connected to the support block and adapted to hold the member;
   a reamer adapted to pass through the member when the member is held in the holder;
   a reamer drive for rotating the reamer about a longitudinal axis; and
   a position drive coupled to the support block for moving the support block along the track wherein the reamer drive and the position drive are separate drives, and wherein the reamer drive rotates the reamer at a constant speed and the position drive simultaneously moves the support block at a constant speed so as to move the reamer through the bored body and ream the bored member.

2. The machine of claim 1, wherein the position drive is coupled to a sprocket that moves a chain coupled to the support block.

3. The machine of claim 1, wherein the longitudinal axis of the reamer is co-axial with a longitudinal axis of the bore of the member.

4. The machine of claim 3, wherein the holder is adjustable to secure members having different outside diameters while maintaining the longitudinal axis of the reamer co-axial with the longitudinal axis of the bore of the member.

5. The machine of claim 1, further comprising a reamer stabilizer attached to the support block and adapted to receive a shaft of the reamer to stabilize the reamer as it passes through the bore of the member.

6. The machine of claim 5, wherein the reamer stabilizer defines a circular aperture for receiving a portion of the shaft of the reamer.

7. The machine of claim 1, further comprising a rotating oil transfer coupling connected between the reamer drive and the reamer, wherein the rotating oil transfer coupling directs cutting oil through a hollow shaft of the reamer.

8. The machine of claim 1, wherein the reamer comprises a shaft having a reamer head disposed at one end.

9. The machine of claim 1, further comprising a controller for controlling the reamer drive and the position drive.

10. The machine of claim 1, wherein the machine comprises a plurality of independently controlled stations each including a support block, a holder, a reamer, a reamer drive, and a position drive, the machine being configured to ream a plurality of members.

11. The machine of claim 10, wherein each station has a controller to control the reamer drive and the position drive of that station independent of the reamer drives and the position drives of the other stations.

12. The method of reaming a bore in a member of claim 1, wherein the member is a gun barrel.

13. The machine of claim 1, wherein the longitudinal axis of the reamer drive is oriented vertically.

14. The machine of claim 1, wherein the reamer is arranged to pass completely through the bored member.

15. The machine of claim 1, wherein the member is tubular.

16. A method of reaming a bore in a gun barrel comprising:
   providing at least one station comprising:
      a support block slidably connected to a track;
      a holder connected to the support block and adapted to hold a gun barrel;
      a reamer adapted to pass through the bore in the gun barrel when the gun barrel is held in the holder;
      a reamer drive for rotating the reamer about a longitudinal axis;
      a position drive mechanically coupled to the support block for moving the support block along the track; and
      a controller for controlling the reamer drive and the position drive;
   providing gun barrel having a bore,
   securing the gun barrel to the holder such that the longitudinal axis of the reamer is co-axial with a longitudinal axis of the bore of the gun barrel, and
   sending a signal from the controller to power the reamer drive and the position drive such that the reamer drive causes the reamer to rotate at a constant speed and the position drive causes the support block to move along the track at a constant speed when the reamer is in contact with the gun barrel,
   wherein the reamer drive and the position drive are separate drives, and wherein the reamer drive rotates the reamer at a constant speed and the position drive simultaneously moves the support block at a constant speed along the track causing the rotating reamer to be received in and pass through at least a portion of the bore of the gun barrel so as to move the reamer through the bored body and ream the bored gun barrel.

17. The method of reaming a bore in a gun barrel of claim 16, wherein the position drive is coupled to a sprocket that moves a chain coupled to the support block.

18. The method of reaming a bore in a gun barrel of claim 16, wherein the step of securing the gun barrel to the holder includes adjusting at least a portion of the holder to move the position of the longitudinal axis of the bore of the gun barrel with respect to the longitudinal axis of the reamer.

19. The method of reaming a bore in a gun barrel of claim 16, wherein a plurality of stations are provided.

20. The method of reaming a bore in a gun barrel of claim 19, wherein control of the reamer drive and the position drive of each station is independent of control of the reamer drives and the position drives of the other stations.

21. The method of reaming a bore in a gun barrel of claim 16, wherein the longitudinal axis of the reamer is vertically oriented.

22. The method of reaming a bore in a gun barrel of claim 16, wherein the reamer passes completely through the bored gun barrel.

23. The method of reaming a bore in a gun barrel of claim 16, wherein the gun barrel is tubular.

* * * * *